United States Patent [19]
Wheeler et al.

[11] Patent Number: 5,208,899
[45] Date of Patent: May 4, 1993

[54] METHOD AND APPARATUS FOR STORING INFORMATION ABOUT AND ASSOCIATING SLOT BEHAVIORS OF A SLOT IN A FRAME-BASED SEMANTIC NETWORK

[75] Inventors: Leslie A. Wheeler; Alison E. Shapiro, both of Pittsburgh, Pa.

[73] Assignee: Carnegie Group, Pittsburgh, Pa.

[21] Appl. No.: 560,141

[22] Filed: Jul. 31, 1990

[51] Int. Cl.⁵ .............................................. G06F 15/18
[52] U.S. Cl. ......................................................... 395/62
[58] Field of Search ........................... 364/513; 395/62

[56] References Cited

U.S. PATENT DOCUMENTS

| | | | |
|---|---|---|---|
| 4,675,829 | 6/1987 | Clemenson | 364/513 |
| 4,964,063 | 10/1990 | Esch | 364/513 |
| 4,965,743 | 10/1990 | Malin et al. | 364/513 |
| 4,999,786 | 3/1991 | Mizutani et al. | 364/513 |

OTHER PUBLICATIONS

Parsaye et al., Expert Systems for Experts, John Wiley & Sons, Inc., 1988, pp. 161-195.
Keene, S. E., Object-Oriented Programming in Common Lisp, Addison-Wesley Pub., 1989, pp. 5-64.
Charniak et al., Artificial Intelligence Programming 2nd Ed., Lawrence Erlbaum Assoc., 1987, pp. 97-110, 276-303.

Primary Examiner—Michael R. Fleming
Assistant Examiner—Robert W. Downs
Attorney, Agent, or Firm—Timothy R. Schulte

[57] ABSTRACT

Method and apparatus are provided for use in a frame-based semantic network wherein at least one specialization slot-control frame defining a specialized behavior is linked to a base slot-control frame defining a global behavior in a hierarchical data structure. Slot behavior is attached to an occurrence of the slot in any other frame such that the slot and its behaviors are inherited to related frames as a unit. All specialized behaviors are compiled into a compact internal format and stored in a reserved space in the slot-control frame. The method and apparatus have particular utility in knowledge-based or expert systems.

6 Claims, 7 Drawing Sheets

```
base_attribute_class foo_                        <——— 410
{ subclassOf: kb_Attribute;

attributes:
    kb_beforeGET = demonA();                     <——— 412
} attribute_specialization_class foo_1             <——— 414
{ subclassOF: kb_Attribute;

specializationOf: foo;

attributes:
    kb_beforeGET = demonB();                     <——— 416
}
```

Figure 5.

```
class Frame3                                    <——— 514
{ subclassOf: Frame1;

attributes:
    (foo;                                       <——— 512
       slot-control: foo_1);                    <——— 510
}
```

Figure 6.

METHOD AND APPARATUS FOR STORING INFORMATION ABOUT AND ASSOCIATING SLOT BEHAVIORS OF A SLOT IN A FRAME-BASED SEMANTIC NETWORK

TECHNICAL FIELD

This invention relates to methods and apparatus for storing information about and associating slot behaviors of a slot in a frame-based semantic network, for example, in the field of artificial intelligence.

BACKGROUND ART

Artificial intelligence (AI) technology is a discipline with an ultimate goal of providing a machine that is capable of reasoning, making inferences and following rules in a manner believed to model the human mind. Artificial intelligence provides relatively untrained users sophisticated computer power to solve practical problems such as to assist in the analysis of massive amounts of relatively unprocessed data to aid in decision-making processes.

As AI technology begins to demonstrate potential and practical uses, tools are needed to speed development of practical computational systems. AI specialists have developed a number of AI-dedicated computer languages to assist in this development. Among the languages are LISP and PROLOG. However, these languages are not particularly easy for either skilled AI researchers or minimally-trained user/programmers to use to develop sophisticated and complex knowledge bases necessary to solve the problems related to artificial intelligence applications.

Over the years, various attempts have been made to develop commercially useful knowledge representation languages. Among the efforts have been FRL (Frame Representation Language), KRL (Knowledge Representation Language), KL-ONE, NIKL, SMALL-TALK, STROBE, UNITS, KEE, ART, Knowledge Craft, and Laser.

In the field of artificial intelligence "knowledge" is a combination of data structures and interpretive procedures which, if suitably manipulated, will lead to what might best be termed "knowledgeable" behavior. A knowledge base is a set of knowledge representations which describes a domain of knowledge. A knowledge base is to an artificial intelligence environment what a database is to a conventional computer program. Unlike a database, however, a knowledge base can include executable program material within a defined record herein called a slot. One type or category of representing knowledge is descriptive knowledge. This category is the collection and classification of facts and categorizations about an idea or entity which might be acted upon. The basic units of descriptive knowledge are generally called frames. A frame contains one or more slots.

As used herein, slots embody the attribute, relationship, and procedural information of the object or concept which is being represented. A collection of slots is a frame which is an atomic unit of knowledge. Two types of frames are provided herein: class and instance. A class frame is used to represent a generalized type or category of object. An instance is used to represent a particular member of a class.

Three types of slots are provided herein: attribute, relation, and message. Attribute slots are used to store values (e.g. integer numbers, character strings, etc.) Relation slots are used to store user-defined links between frames in the knowledge base. Message slots are used to store procedural code (i.e. functions) which is executed in response to messages sent to the frame by an application program.

One of the key concepts of artificial intelligence is that of inheritance. It is a development of the idea of using a hierarchical structure for relating frames in a knowledge base. The key to these structures is the concept of connecting relations between structures of data or knowledge through which information about slots may pass to other structures of data or knowledge.

The concept of representing knowledge as hierarchical data structures with inheritance was first referred to in terms of frames by its most prominent early supporter, Marvin Minsky of the Massachusetts Institute of Technology. Minsky gave the first general description of the concept and laid the intellectual groundwork for development of practical systems implementation of a frame-based system. Subsequent work in first generation knowledge representation systems produced very stylized inheritance mechanisms lacking in flexibility or yielding inheritance structures which were cumbersome and so slow as to be of only limited utility in large knowledge bases.

The concept of inheritance has a number of advantages. First, an inheritance mechanism allows the specification of many components of a data structure o knowledge structure through reference to other data structures or knowledge structures. High-level data structures or knowledge structures refer to organized collections of simpler data structures or knowledge structures, such as a collection of various relations in a relational database sense, or a collection of logical assertions as in the predicate calculus sense.

Second, an inheritance mechanism can assure consistency among high-level data or knowledge structures. That is, the inheritance mechanism can be used to specify that a given data or knowledge structure must obey restrictions placed on characteristics from other data or knowledge structures inherited from other data or knowledge structures.

Third, the inheritance mechanism allows the implementation of semantics. That is, the inheritance mechanism is a technique for combining higher level concepts and specifying meaning.

As described herein, inheritance search is performed by all functions which access slots and values when the slot or its values are not stored locally in the frame. Inheritance involves searching for a specific slot in a frame network starting at a particular frame and traversing connections from that frame to other frames.

For purposes of the present application, slots in a frame have both global and local behaviors. Global characteristics of a slot include:

Slot-type: whether the slot is an attribute, relation, or message.

Value-type and cardinality: these characteristics may be specified for attribute slots; relation slots may have values which are pointers to other frames and allow multiple values; message slots may have a single value, which is a pointer to a function.

the name of the inverse-relation of a relation slot.

Other slot behaviors need not have global scope. In particular, a great deal of flexibility is provided in defining the following behaviors for slots:

Demons, which can be attached to any type of slot. Demons are procedures automatically executed when a slot is accessed or modified.

Inheritance characteristics of user-defined relations.

In prior systems, the behaviors attached to a slot are either: 1) strictly global in scope, applying to the slot in all frames in which the slot appears, or 2) global in scope, with strictly local behavior overrides specifiable for the slot in a particular frame.

No prior system offers a clean, integrated set of features for specifying and inheriting slot behaviors. Some systems (e.g., Nexpert) offer strictly global specification of slot behavior. Others (e.g., Laser) offer strictly local attachment of behaviors. Knowledge Craft offers global specification of slot behaviors, strictly local overrides to global behaviors, and a switchable mode in which local overrides can be inherited.

However, the Knowledge Craft mechanism had a number of shortcomings: poor performance, a confusing mixture of paradigms which support base slot-control frames but not specialization slot-control frames; and a requirement that local specializations be specified via meta-information (auxiliary frames which could be attached to slots), thereby producing a confusing set of semantics in which meta-information is used both for the storage of user knowledge and for the storage of purely system information such as slot behaviors.

SUMMARY OF THE INVENTION

An object of the present invention is to provide a method and apparatus having clean semantics, high run-time performance, and slot behaviors which are automatically inherited along with the slot.

In carrying out the above object and other objects of the present invention, a method is provided in a frame-based semantic network for storing information about the behaviors of a slot in a frame. The method includes the steps of creating a plurality of slot-control frames for the slot and storing information about the slot and its global behavior and at least one specialized behavior associated with the slot. The method also includes the steps of linking the plurality of slot-control frames to create a hierarchical data structure including a base slot-control frame defining the global behavior and at least one specialization slot-control frame defining a specialized behavior.

Further, in carrying out the above object and other objects of the present invention, a method is provided in a frame-based semantic network for associating slot behaviors with the occurrence of a slot in any frame in the network. The method includes the same steps as in the prior method described immediately above as well as the step of attaching the behaviors stored in at least one of the slot-control frames to an occurrence of the slot in another frame such that the slot and its behaviors are inherited to related frames as a unit.

Also provided are apparatus for carrying out the method steps described above.

The advantages of the method and apparatus of the present invention are numerous. For example, in addition to providing a high degree of flexibility, the method and apparatus fulfill the user's expectations of "natural behavior" (i.e. a slot's behaviors depend solely on where that slot was inherited from). Also, the specification of slot behaviors is cleanly separated from any knowledge which the user may wish to store about the slot. This is in contrast to the Knowledge Craft system noted above wherein local specifications are stored as meta-information attached to the local slot. The Knowledge Craft method requires considerably more work on the part of users who wish to store their own meta-information on the slot.

Another advantage is that slot behaviors can be specialized in an entire frame subhierarchy simply by attaching the specialized behaviors to a slot in a frame at the top of the hierarchy. When the slot is inherited from that frame to related frames, the specialized behaviors are also inherited. The user can create as many subhierarchies of specialized behaviors for a single slot as are needed.

Finally, changes to the behaviors attached to a slot at the top of a subhierarchy are automatically visible throughout the subhierarchy.

The above advantages and other advantages and features of the present invention are readily apparent from the following detailed description of the invention when taken in connection with the accompanying drawings.

BRIEF DESCRIPTION OF THE DRAWINGS

FIG. 5 is a set of statements which illustrate the proper frame definition/syntax for a particular base slot-control frame and a specialization thereof;

FIG. 6 is a set of statements which illustrate the proper frame definition syntax for attaching a particular specialization slot-control frame to an occurrence of the slot in another frame.

BEST MODE FOR CARRYING OUT THE INVENTION

Figure 1:
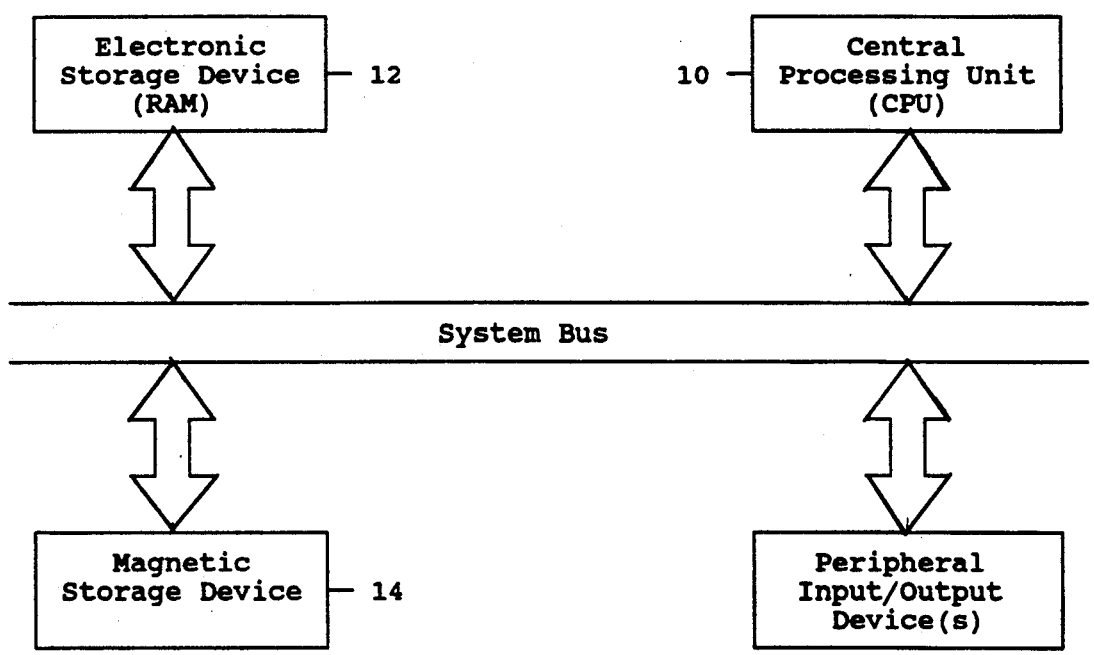
FIG. 1 is a schematic block diagram view illustrating the hardware components necessary to implement the method and apparatus of the present invention.

For purposes of the present invention, the global features of a slot—slot-type (attribute, relation or message), the value-type and cardinality (of an attribute slot), and the name of the inverse (of a relation slot)—need to be specified for a slot only once, and they are not changed dynamically. These global characteristics apply to the slot wherever it is used.

Other slot behavior, however, need not be globally specified. Demons and inheritance across user-defined relations can be specified to apply only to those frames which can inherit particular specialized behaviors for the slot.

Also, for purposes of the present invention, a demon is a function which the developer associates with an attribute, relation, or message slot and which is automatically invoked when the associated slot is accessed or modified. A demon is not directly invoked by the application; it is triggered when the slot that it is associated with is found during inheritance search.

Referring now to the drawing figures,

FIG. 1 illustrates the general purpose digital computer required by the present invention. This computer must have a processing means 10 and a memory means 12 and/or 14.

Figure 2:
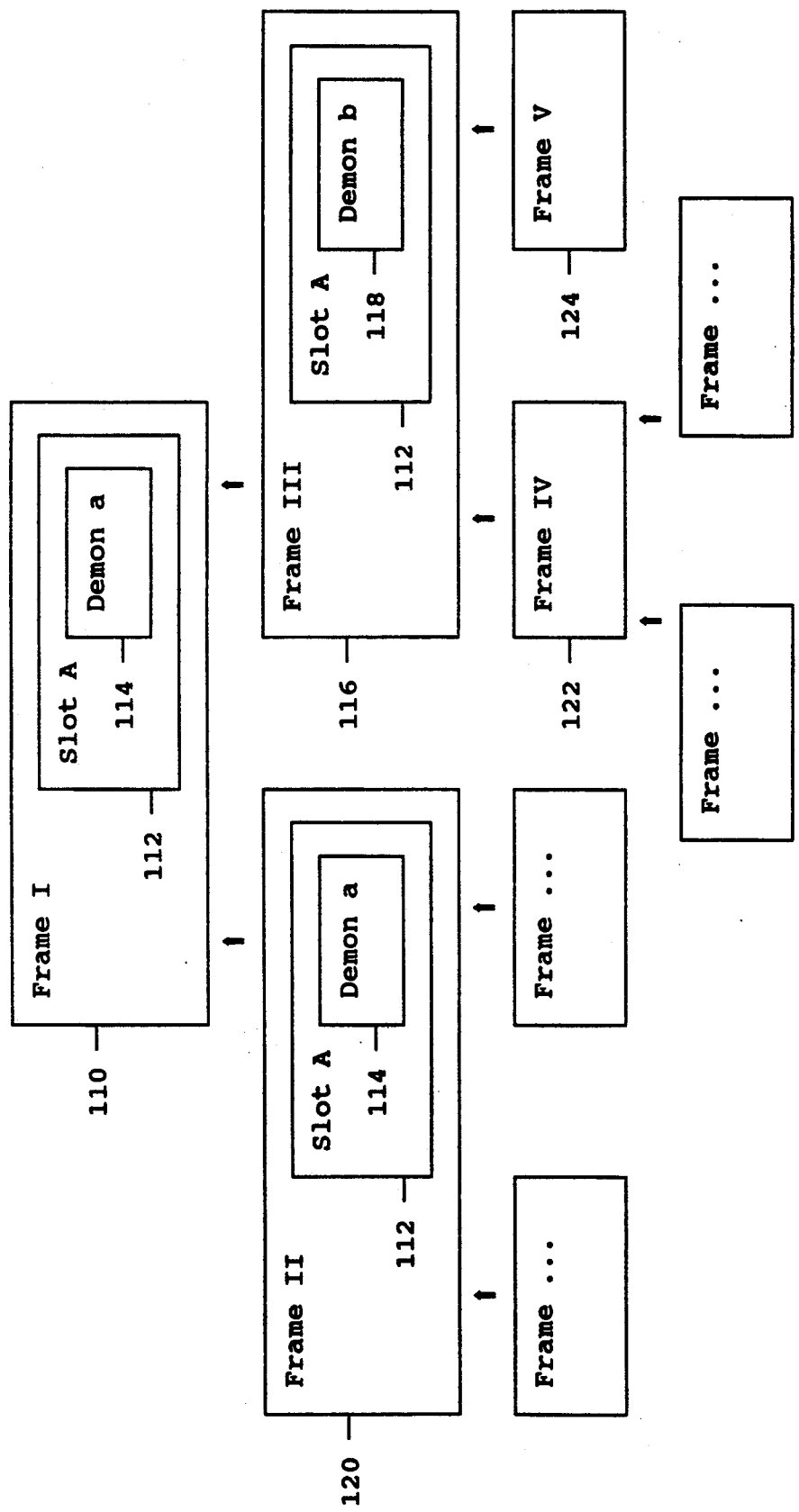
FIG. 2 is a schematic block diagram view illustrating behavior inheritance under the method and apparatus of the present invention.

FIG. 2 illustrates the method and system of the present invention. The most common form of behavior associated with a slot is the attachment of demons. In Frame I 110, Slot A 112 has Demon a 114 attached, while in Frame III 116, Slot A 112 has a different demon, Demon b 118 attached. As Slot A 112 is inherited from Frame I 110 to Frame II 120 and to frames beneath Frame II 120 in the hierarchy, Demon a 114 will automatically be attached to these occurrences of Slot A 112. However, as Slot A 112 is inherited from Frame III 116 to Frame IV 122, Frame V 124, and other frames beneath Frame III 116 in the hierarchy, Demon b 118 will be attached to these occurrences of Slot A 112.

Figure 3:
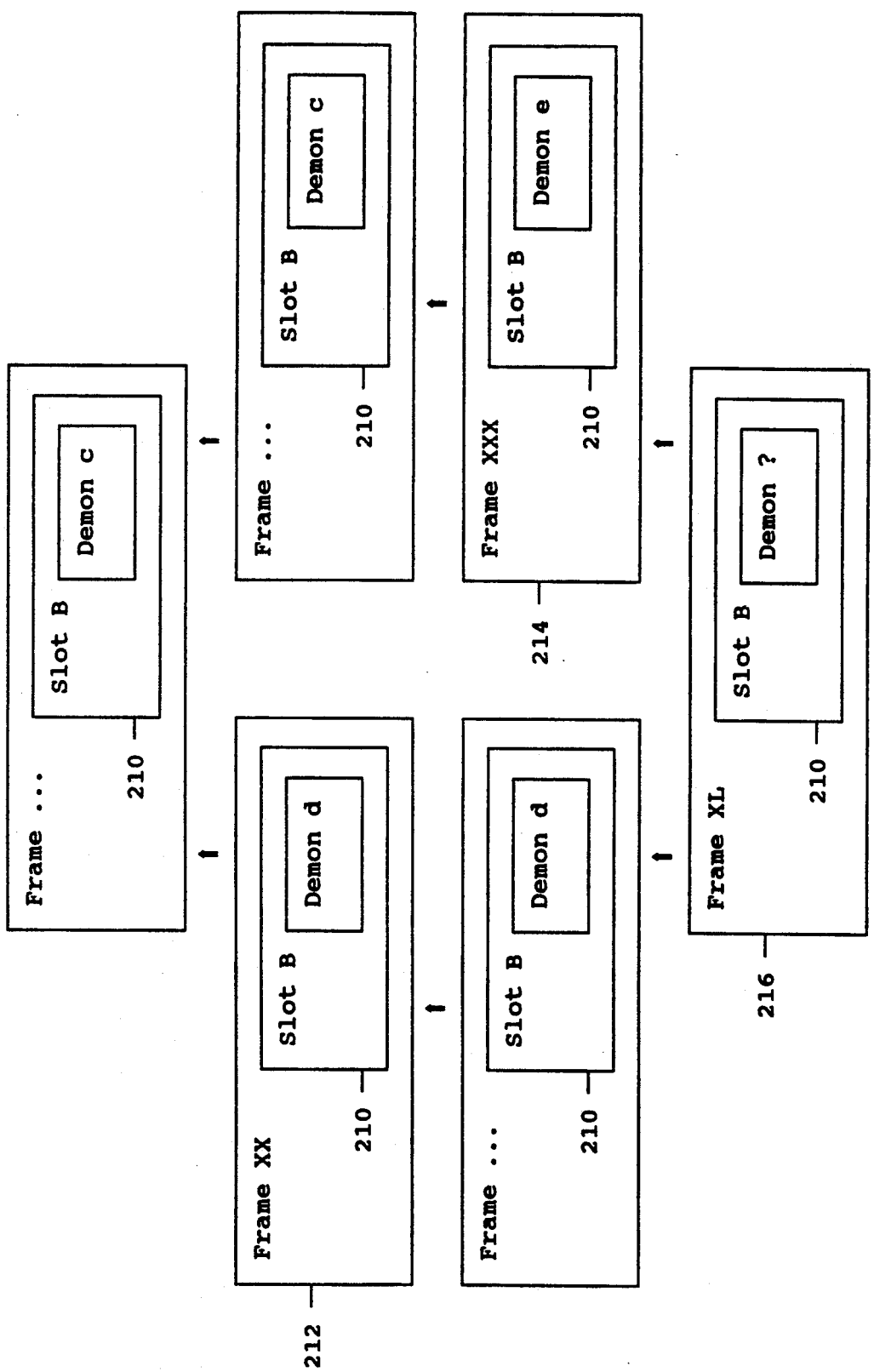
FIG. 3 is a schematic block diagram view also illustrating behavior inheritance under the method and apparatus of the present invention.

FIG. 3 illustrates a somewhat more complex situation. Different behaviors are associated with Slot b 210 in Frame XX 212 and Frame XXX 214. As Slot b 210 is inherited to Frame XL 216, the behavior associated with Slot b 210 will depend on whether the slot is inherited from Frame XX 212 or Frame XXX 214. (This, in turn, depends on whether the user chooses to conduct a depth-first or a breadth-first inheritance search). The underlying principle is that the slot and behavior associated with a slot are inherited together as a unit.

When a slot is inherited and created locally in a frame, its behavior is also inherited to the new local slot in the frame. Slot behavior inheritance follows the same principles as slot inheritance: the behavior for a slot is taken from the frame in which the slot is first found during the inheritance search.

DETAILED DESCRIPTION OF THE PREFERRED EMBODIMENT

The two major components of the method and apparatus of the present invention are:

A. The manner in which slot behaviors are specified to the system.

B. The manner in which slot behaviors are attached and inherited to frames in the system.

SPECIFYING SLOT BEHAVIORS

Slot-control behaviors are specified by creating slot-control frames. These frames are very similar to other frames in the semantic network, differing only in their special declaration as slot-control frames.

There are two major types of slot-control frames. A base slot-control frame has the same name as the slot and defines the global characteristics for the slot and any other default behavior for the slot.

Frames which define more local behavior for the slot are referred to as specializations of the base slot-control frame. Slot specialization makes it possible to associate specialized behavior with a slot without changing the name or global characteristics of the slot.

Figure 4:
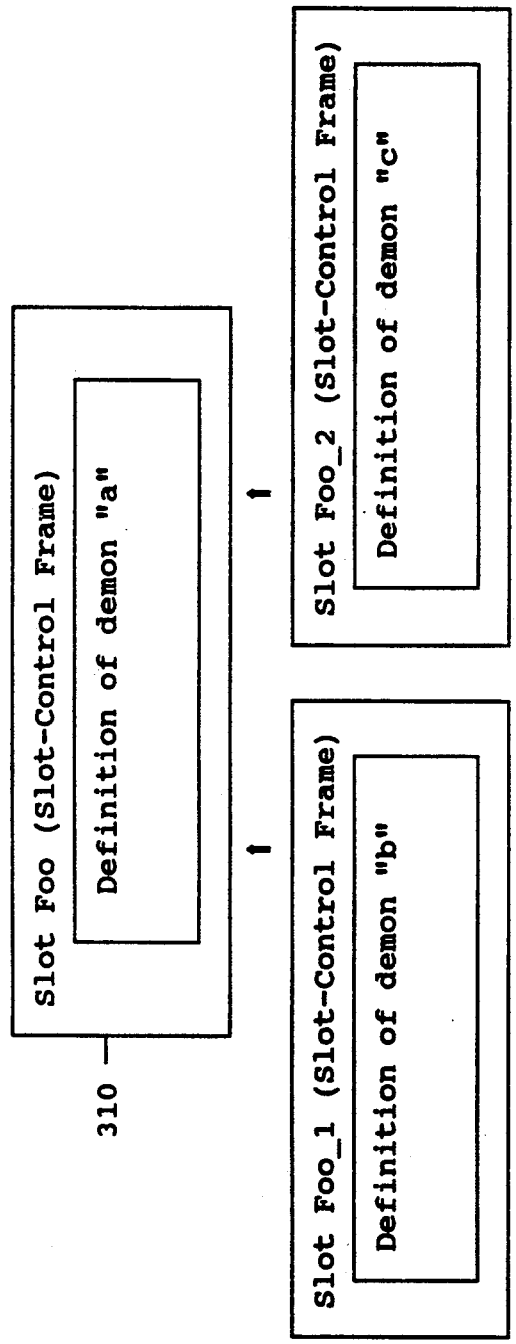
FIG. 4 is a schematic block diagram view illustrating a hierarchical data structure of slot control frames, consisting of a base slot-control frame and three specialization slot-control frames in accordance with the method and apparatus of the present invention.

Each slot in the knowledge base has an associated base slot-control frame and at least one specialization slot-control frame. The specialization slot-control frames are linked via the "specialization of" relation to form a slot-control hierarchy. FIG. 4 illustrates the slot-control hierarchy for the slot named "foo" generally referred to by 310;

As previously mentioned, the base slot-control frame for a slot has the same name as the slot whose behaviors the slot-control frame defines. As illustrated by FIG. 5, the base slot-control frame for a slot named "foo" generally referred to by 410 is also named "foo." The behaviors that may be associated are:

For any kind of slot, the names of any of a number of types of demons that may be attached to a slot (e.g. slot "foo" has demon A) generally referred to by 412.

For relation slots only, the inheritance characteristics of the relation.

If only a base slot-control frame is defined for a slot, the slot behaviors of that slot are global.

A specialization of a base slot-control frame can be used to modify the behavior specified by the base slot. The name of a specialization slot-control frame must be different from the slot name. Specialization allows the same slot name to be used in different parts of an application with different behavior. FIG. 5 illustrates the definition of the specialization slot-control frame named "foo 1", generally referred to by 414 which specializes slot "foo" by defining demon B generally referred to by 416.

When a slot-control frame is defined, all special behaviors are compiled into a compact internal format and stored in a reserved space in the slot-control frame structure. This compact internal representation makes subsequent accesses of the information much faster.

A slot-control frame may be explicitly attached to an occurrence of the slot in a frame in the knowledge base. FIG. 6 illustrates syntax for the attachment of specialization "foo 1" generally referred to by 510 to the slot "foo" generally referred to by 512 in Frame generally referred to by 514.

When a slot is added to a frame, either when the frame is defined or when the slot is inherited, the system must decide what slot behavior to associate with the slot. The following algorithm is used:

If either the base slot-control frame or one of the specialization slot-control frames for the slot is explicitly named when a frame is defined, the behaviors associated with that slot-control frame are associated with the occurrence of the slot.

If the slot can be inherited to the frame, then the behaviors associated with the inherited slot are associated with the local occurrence of the slot.

If neither of the above is true, the behaviors of the base slot-control frame for the slot are associated with the local occurrence of the slot.

Each occurrence of a slot in the knowledge base contains a pointer to an intermediate data structure which connects the occurrence of the slot to the governing slot-control frame. This pointer is determined when the slot is first declared-in or inherited to the frame. The pointer is changed only if a different slot-control frame is explicitly attached to that occurrence of the slot. Thus, the overhead for retrieving the slot-behavior for a slot is constant, independent of the number of specializations.

Figure 7:
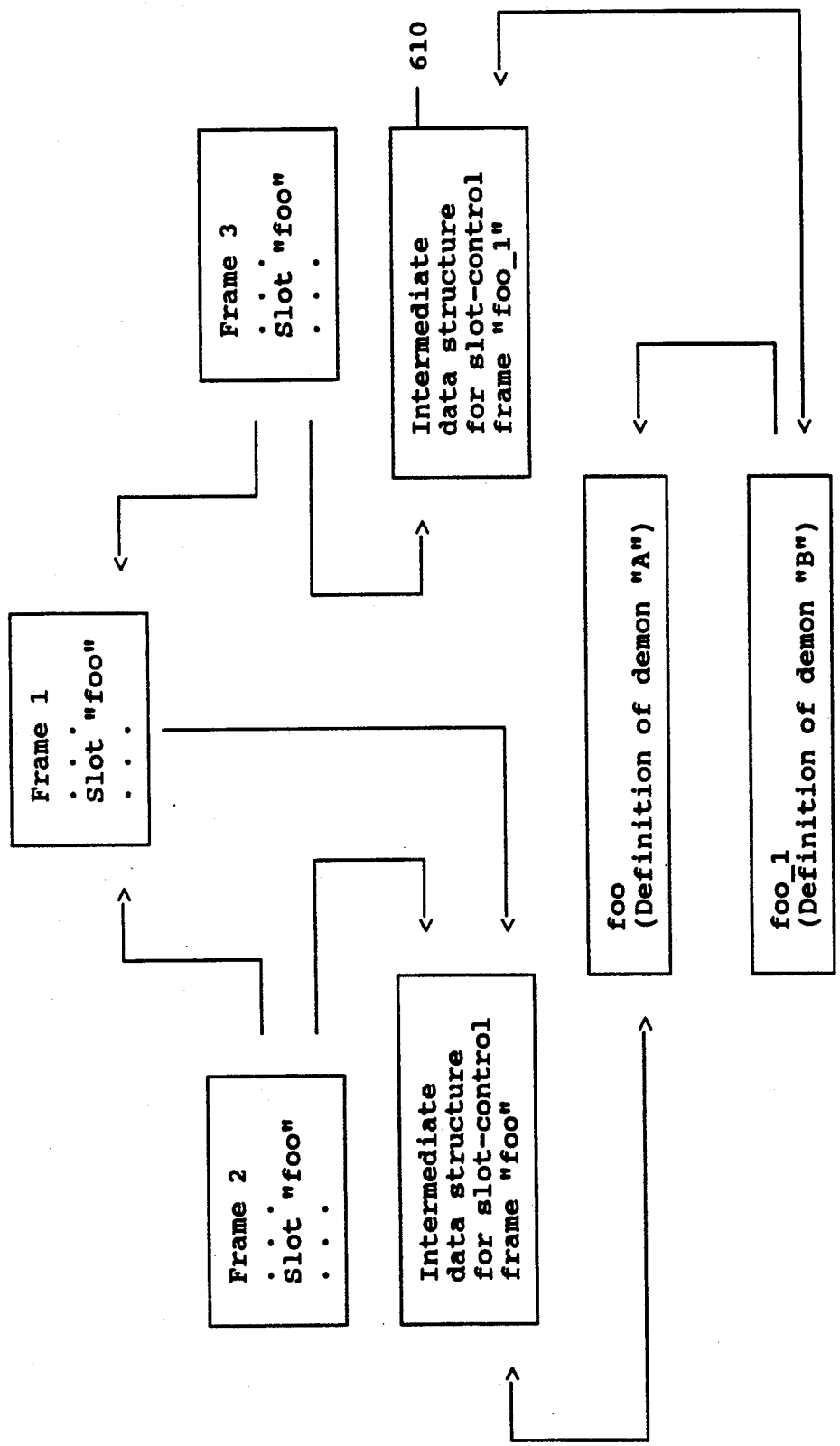
FIG. 7 is a schematic block diagram view illustrating the shared intermediate data structure which connects an occurrence of a slot in a frame to the governing slot-control frame in accordance with the method and apparatus of the present invention.

Finally, the slot-control frame itself can be modified (e.g. by the addition or removal of a demon); these modifications are visible to all occurrences of the slot governed by that slot-control frame. FIG. 7 illustrates how this intermediate data structure generally referred to by 610 is shared by all occurrences of the slot "foo" governed y a specific slot-control frame.

The power of the method and apparatus of the present invention is demonstrated by the following examples, in which the behavior of a slot is specialized at some point in the knowledge base:

EXAMPLE 1

A demon is attached and detached from a slot in a particular frame.

For example, consider a banking system which monitors account balances which have been overdrawn. The monitoring function might be attached as a demon on a "balance" slot on those instances of account which have sub-zero balances. At some future point, when an account instance no longer needs to be monitored, the demon is removed from the "balance" slot.

This can be accomplished by defining a specialization of the "balance" slot-control frame which specifies the desired demon behavior. The occurrence of the "balance" slot in instances which must be monitored can be associated with the specialization slot-control frame which defines the demon. To detach the demon when the balance becomes positive, the base slot-control frame (balance) is reattached to the occurrence of the slot in the instance.

EXAMPLE 2

A slot is used, with different behaviors, in multiple hierarchies.

This situation is common in large systems where several people are developing the knowledge base. The same slot name may be used with different demons, for example, in different hierarchies of the application's knowledge base. While slot specialization does not allow multiple definitions of the slot's global features, such as the value-type of attribute slots, it does allow different demons and/or different inheritance specifications to be attached to the slot in different places in the knowledge base without conflict.

This may be accomplished by defining slot specializations for each of the different behaviors and attaching those specializations to the occurrence of the slot at the highest point where it is used in each of the sub-hierarchies. Descendant frames which inherit the slot would then inherit the appropriate behaviors for that subhierarchy.

EXAMPLE 3

The inheritance of a user-defined relation is specialized for a particular frame.

Specializing inheritance behaviors is especially useful for general relations like PARTOF, which are, perhaps, too general to allow any sort of global, default inheritance. When used within particular frames, however, the behavior is more well-defined, and particular inheritance characteristics may be specified.

EXAMPLE 4

The behavior of a slot is modified in some frame and the developer desires the modification to be visible to any other frames which have already inherited that slot from that frame.

A common example is a demon which, when attached to an occurrence of a slot in a class frame, is visible to all instances of that class, whether or not they had previously inherited the slot. The method and apparatus of the invention guarantees that any instances inheriting a slot after a new slot specialization is attached to the occurrence of the slot in a class frame will inherit the specialized behavior. Instances which had inherited and cached the slot locally before the specialization was attached, however, normally would not see the new behaviors. There is, however, an easy way to ensure that the new behaviors will be visible, which involves using specialization in a slightly different manner. The method and apparatus guarantee that when the behavior specified by an existing slot-control frame is changed, the new behavior is visible to all frames that have slots which are controlled by that slot-control frame, whether the slot was inherited before or after the modifications to the slot-control frame.

A specialization slot-control frame is associated with the occurrence of the slot in the class frame. Initially, this specialization may not define any new behavior. Instances of the class, when they inherit the slot, will inherit the behavior defined by this specialization. When it becomes necessary, for example, to add a demon at the class level, this is done by directly modifying the existing slot-control specialization frame associated with the slot in the class (rather than by attaching some new slot-control frame to that slot). When a slot-control schema is modified (by, for example, adding demons), the new behavior is visible to all schemata which already have inherited, or will inherit, a slot with which this slot-control frame is associated.

A similar effect results when the base slot-control frame is modified directly. The new behaviors are visible to all slots associated with the base slot-control frame. The new behaviors are visible to all occurrences of the slot in the application knowledge base when no specializations for that slot are defined.

While the best mode for carrying out the invention has been described in detail, those familiar with the art to which this invention relates will recognize various alternative designs and embodiments for practicing the invention as defined by the following claims.

What is claimed is:

1. In a frame-based semantic network, a method of operating a processing means to associate slot behaviors with the occurrence of a slot in any frame in the network, the method comprising the steps of:

utilizing the processing means to create in a memory means a plurality of slot control frames for the slot;

storing in the memory means information about the slot and the global behavior and at least one specialized behavior associated with the slot;

utilizing the processing means to link the plurality of slot control frames to create a hierarchical data structure in the memory means including a base slot control frame defining the global behavior and at least one specialization slot control frame defining a specialized behavior; and utilizing the processing means to attach the behaviors stored in the memory means in at least one of the slot control frames to an occurrence of the slot in another frame such that the slot and its behaviors are inherited to related frames as a unit.

2. The method as claimed in claim 1 wherein the representation of the slot in a frame includes a point which points to a shared intermediate data structure.

3. The method as claimed in claim 2 wherein there is a one-to-one correspondence between the shared intermediate data structure and a slot-control frame such that all slot occurrences governed by a particular slot-control frame point to the shared intermediate data structure.

4. In a data processing system including processing means and memory means operatively coupled to the processing means for storing a frame therein, apparatus for associating slot behaviors with the occurrence of a slot in any frame in a frame-based semantic network, the apparatus comprising:
   means for creating a plurality of slot control frames for the slot in the memory means;
   means for storing information about the slot and a global behavior and at least one specialized behavior associated with the slot in the memory means;
   means for linking the plurality of slot control frames to create a hierarchical data structure in the memory means including a base slot control frame defining the global behavior and at least one specialization slot control frame defining a specialized behavior; and
   means for attaching the behaviors stored in the memory means in at least one of the slot control frames to an occurrence of the slot in another frame such that the slot and its behaviors are inherited to related frames as a unit.

5. The apparatus as claimed in claim 4 wherein the representation of the slot in a frame includes a pointer which points to a shared intermediate data structure.

6. The apparatus as claimed in claim 5 wherein there is a one-to-one correspondence between the shared intermediate data structure and a slot-control frame such that all slot occurrences governed by a particular slot-control frame point to the shared intermediate data structure.

* * * * *